July 26, 1960 E. R. KRETZMER 2,946,851

TELEVISION SYSTEM HAVING REDUCED TRANSMISSION BANDWIDTH

Filed March 21, 1956 4 Sheets-Sheet 1

INVENTOR
E. R. KRETZMER
BY W. L. Keefauver
ATTORNEY

July 26, 1960 E. R. KRETZMER 2,946,851

TELEVISION SYSTEM HAVING REDUCED TRANSMISSION BANDWIDTH

Filed March 21, 1956 4 Sheets-Sheet 2

INVENTOR
E. R. KRETZMER
BY W. L. Keefauver
ATTORNEY

TELEVISION SYSTEM HAVING REDUCED TRANSMISSION BANDWIDTH

Filed March 21, 1956 4 Sheets-Sheet 3

INVENTOR
E. R. KRETZMER
BY W. L. Keefauver
ATTORNEY

TELEVISION SYSTEM HAVING REDUCED TRANSMISSION BANDWIDTH

Filed March 21, 1956

INVENTOR
E. R. KRETZMER
BY W. L. Keefauver
ATTORNEY

United States Patent Office 2,946,851

Patented July 26, 1960

2,946,851

TELEVISION SYSTEM HAVING REDUCED TRANSMISSION BANDWIDTH

Ernest R. Kretzmer, New Providence, N.J., assignor to Bell Telephone Laboratories, Incorporated, New York, N.Y., a corporation of New York Filed Mar. 21, 1956, Ser. No. 573,022

19 Claims. (Cl. 178—43.5)

This invention relates to the transmission and reception of electrical communication signals and more particularly to the transmission and reception of electrical communication signals which ordinarily require considerable transmission channel capacity.

It is an object of this invention to effect a reduction in the transmission channel capacity required for the transmission of such signals.

In order to insure faithful reproduction at the receiver of the entire range of frequencies and amplitudes contained in communication signals, for example, television signals, many present day communication systems employ broad band transmission channels. There is an economic defect in such systems, and workers in the art are constantly seeking ways and means of reducing the necessary channel capacity. Because it is well known that the frequency bandwidth required for the transmission of satisfactory television images depends both upon the properties of the eye such as persistence of vision, acuity, and upon the departures from perfection which the observer regards as tolerable, transmission systems have been proposed which take advantage of these tolerances.

For example, one approach, as embodied in United States Patent 2,629,010 to R. E. Graham, comprises splitting the communication signal, in this case, a television video signal, into low and high frequency components and systematically discarding a portion of the high frequency components.

Other proposed systems utilize the correlation present in most television scenes to reduce bandwidth by the reduction of redundancy. Typically, prediction schemes have been suggested, but predicting with sufficient accuracy to make possible a significant decrease in total bandwidth necessitates the use of highly specialized and complex terminal equipment.

Some transmission systems make use of a process of sampling and quantizing, which converts continuous scales of time and amplitude, respectively, into discrete scales, permitting representation of the signal by a finite number of code symbols chosen from an "alphabet" containing a finite number of symbols. As disclosed in United States Patent 2,681,385 to B. M. Oliver, sampling alone does not entail any loss of information if the sampling frequency is at least twice as great as the highest frequency of interest in the intelligence. In such case, the effects of sampling are not discernible in the final signal. Quantization likewise does not entail any loss of information if the number of quantizing levels is sufficiently high, but at the same time a large required channel capacity results from the use of a large number of levels.

Heretofore, efforts to reduce channel capacity requirements by reducing the number of quantizing levels have given rise to annoying defects in the picture as finally viewed at the receiver. Since quantizing the signal divides the brightness range of the picture into a finite number of brightness subranges, each range being represented by a single level, any gradual change in brightness across the picture will appear as a series of discrete steps, that is, there will be visible equal brightness contours in the picture. In addition, where there is a large area in the picture having a uniform brightness near the limit of one quantizing range, a small amount of noise may randomly shift the amplitudes of samples of the picture signal into the next quantizing range, giving rise to defects in the picture which can be quite disturbing to the viewer. It has been necessary, therefore, to quantize at a sufficiently large number of levels to prevent these picture defects from becoming intolerable to the viewer. However, when such a number of levels is used, encoding the quantized signal in order to reduce channel requirements becomes impractical.

In my copending application Serial No. 544,516, filed November 2, 1955, now Patent 2,850,574, granted September 2, 1958, there is disclosed a frequency separation system for the reduction of the transmission bandwidth of electrical communication signals in which the reduction is achieved by dividing the communication channel into two or more frequency bands, one of which contains the low frequency portions of the signal, and the others of which contain the higher frequency portions. The high frequency portions of the signal are sampled, coarsely quantized, coded and transmitted at a reduced channel capacity, while the low frequency portion is transmitted intact. At the receiver the coded high frequency portions of the signal are decoded and recombined with the low frequency portion to produce a complete signal. A system based on the separation of high and low frequency components as a means for separate handling of fine detail and large area picture material, while affording a reduction in overall required channel capacity, necessitates transmission of two or more signal components on two or more separate channels or on one channel capable of accommodating all of the components.

In the foregoing it was pointed out that quantizing a video signal with an insufficient number of levels gives rise to two principal annoyances, namely brightness contour lines, and imperfect quantizing as a result of random noise. Both of these phenomena are "large-area" effects. That is, they become intolerable only when they occur in portions of the picture where the eye is sufficiently acute to observe them. On the other hand, it has been observed by applicant that the areas of the picture containing large amounts of detail, which involve the high frequency components of the video spectrum do not appear to exhibit these annoying effects. This can be accounted for by the fact that although these effects of quantizing might be present the eye of the observer is not sufficiently acute to observe them. In the present invention, use is made of this phenomenon of visual acuity to effect a reduction in the necessary channel capacity.

The present invention is directed to a system which effects a reduction in bandwidth by the use of two alternative modes of transmission, both of which require the same low channel capacity, and both of which are particularly well adapted for particular types of picture information.

It is in accordance with the invention to separate the original signal into two portions to which the human senses are sensitive to markedly different degrees, and to treat each of these portions in such a way as to enable transmission at a substantially reduced bandwith and with a degradation of each signal in such a manner that it is substantially indiscernible to the human senses.

In particular, the desired reduction in bandwidth is effected in an illustrative embodiment by coarsely quantizing that portion of a signal containing fine detail, involving fast changes, at a normal sampling rate, and finely quantizing that portion of a signal containing soft areas, involving only slow changes at a reduced sampling rate to produce two modes which require the same low channel capacity, and subsequently transmitting only one mode at a time. Thus the information rate is constant, with the manner of conveying the information adapted to the local picture characteristics, i.e., high definition, coarse brightness in areas of fine detail, and low definition, accurate brightness where no detail is present. The two corresponding modes will be called fast mode and slow mode, respectively, in the description which follows.

The invention will be more fully understood from the following detailed description of certain illustrative embodiments thereof taken in connection with the appended drawings, in which:

Fig. 1 is an overall block diagram of a television signal transmission system which embodies principles of the present invention;

Fig. 2 consists of a series of curves illustrating the sampling operation of Fig. 1;

Figures 1, 3:
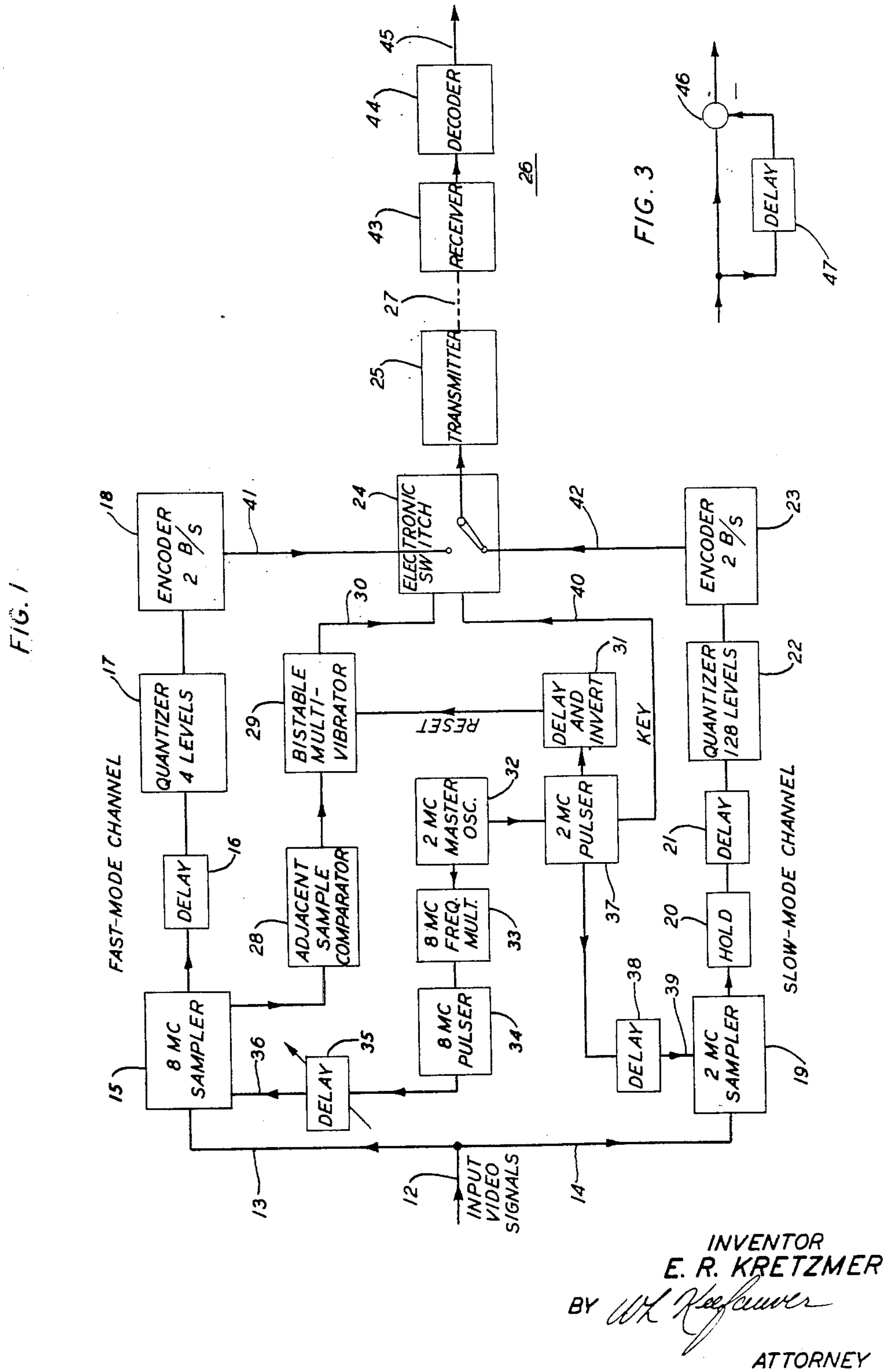
Fig. 3 is a diagram of an adjacent sample comparator suitable for use with the invention.
Figure 7:
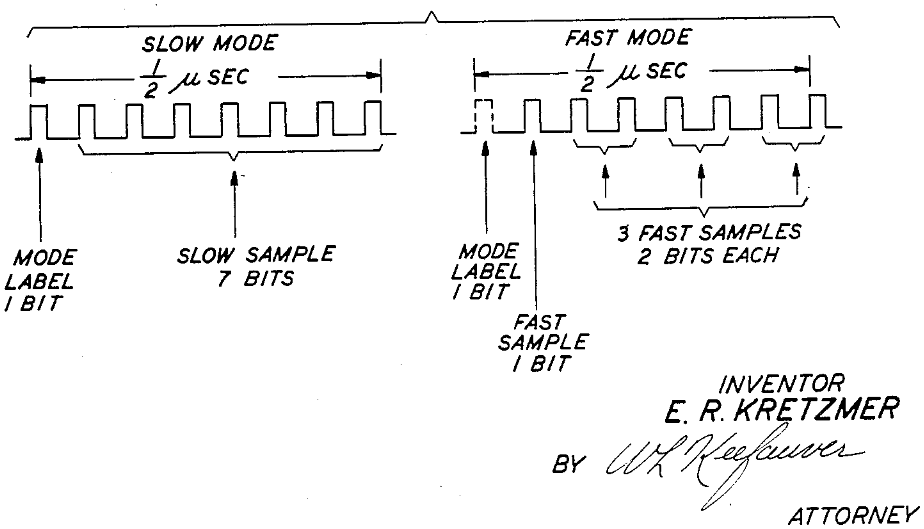
Figure 6:
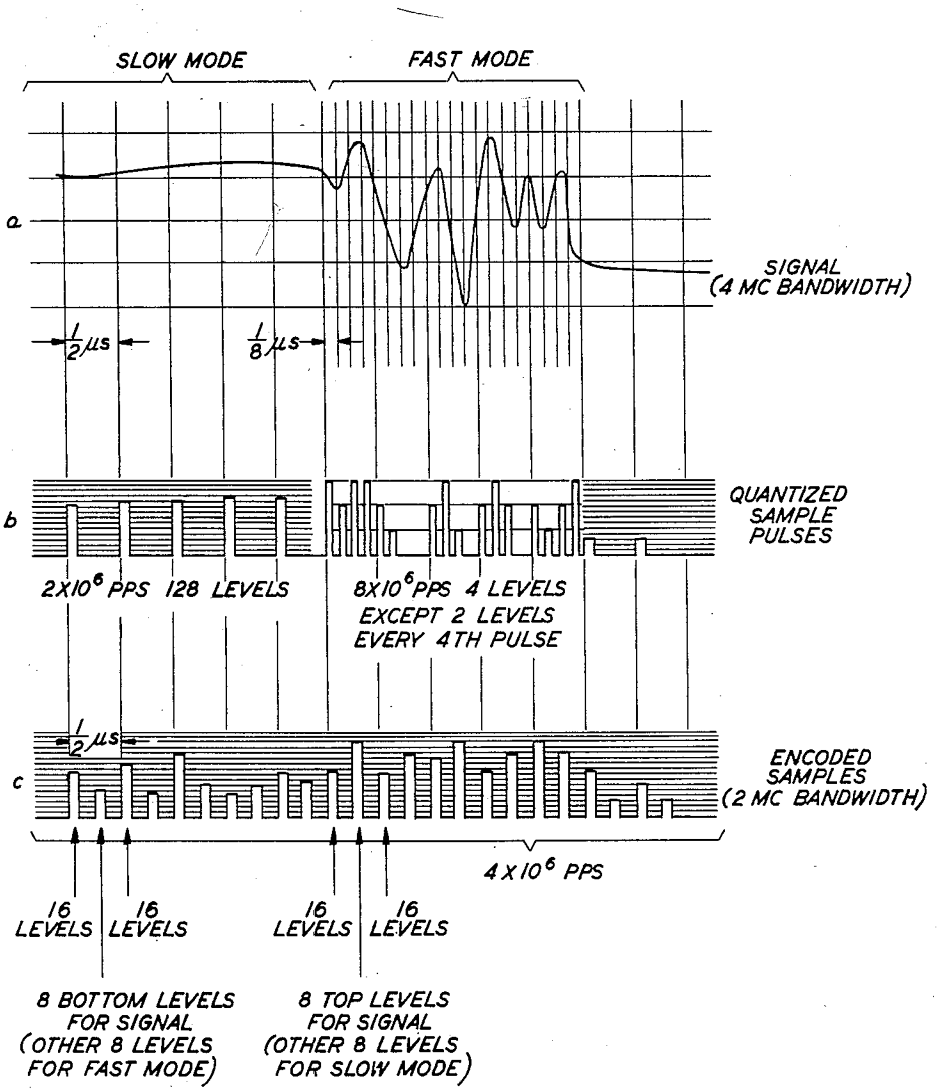

Fig. 6 consists of a series of signal wave patterns which are found at certain points in the system of Fig. 1; and Fig. 7 illustrates another particular coding technique.

The invention will be explained hereinafter as applied to the transmission of television video signals although it is not intended to be limited to the transmission of such signals, inasmuch as the principles of the invention are readily applicable to the transmission of other types of electrical communication signals.

With reference now to Fig. 1, there is shown a television signal transmission system employing the principles of the invention. A complete video signal, which may be the standard RTMA signal derived from a video camera and associated amplifiers, not shown, is supplied simultaneously to the two transmission paths labeled Fast Mode Channel and Slow Mode Channel. In each channel the signal is periodically sampled at a predetermined rate, delayed for a fixed predetermined period of time, quantized into a plurality of discrete ampliture levels, and encoded in a manner such that there are supplied to electronic switch 24 by way of leads 41 and 42, two encoded signals, both of which are representative of the input signal and both of which have the same information rate. Each encoded output signal, as will be described hereinafter, comprises a signal in a mode particularly well adapted for representation of one region of a picture in a manner that makes possible a considerable reduction in required channel capacity and hence in bandwidth. Included in one or both of the encoded output signals is sufficient mode information to identify each encoded sample as a fast-mode sample or a slow-mode sample.

The decision as to which of the encoded signals representative simultaneously of the input signal is to be transmitted, is made, for example, by comparing samples of the input signal to detect changes in signal amplitude, and hence detail content, prior to the time at which the chosen encoded signal is supplied to the transmitter. Electronic switch 24, responsive to this decision, may be utilized to supply one of the two encoded signals to transmitter 25 for transmission by way of a transmission channel or medium 27 to receiving station 26. Since each of the encoded signals has the same effective information rate, transmitter 25 requires no unusually complex circuitry. The transmitter may be of a standard form and it is represented here as block 25. Likewise, transmission medium 27 may be a medium of any type well known in the art.

The receiving station terminal equipment 26 comprises the normal standard elements of a receiver such as receiving antenna and demodulators and the like which are represented by block 43. The received signal is applied to a decoder 44, whose function is to decode the signal in a manner just the inverse of that used at the transmitter to produce a facsimile of the input signal. The mode information accompanying the signal is used to tell the decoder which mode is being used for each sample. Included in the decoder may be holding or filtering means to accord an appropriate smoothing treatment to the slow-mode signal to reduce possible granularity resulting from the subnormal sampling rate. Such smoothing may be accomplished in any way well known to those skilled in the art.

Considering now a video signal which may be typically four megacycles in bandwidth and which is supplied by way of leads 12 and 13 to the fast-mode sampler 15, the signal is repetitively sampled at a predetermined rate, for example, at eight megacycles. It is to be understood that the eight-megacycle sampling rate specified for the fast-mode channel, and similarly the two-megacycle sampling rate specified for the slow-mode channel are illustrative only and are not intended to be limiting since the principles of the invention are applicable to other sampling rates.

The signal, after sampling at an eight-megacycle rate in sampler 15, is delayed for a period of time T by circuit 16, which may be any well known type of delay network. In the illustrative example given here the period T is equal to approximately one-half microsecond which is the period of time required for one sampling interval at the slow-mode or two-megacycle rate, and consequently the time required for four sampling intervals at the eight-megacycle or fast-mode rate. This delay is necessary, in both channels, to allow an examination to be made of the signal prior to the time that a switching operation is performed to select either the fast-mode or slow-mode representation for transmission. This examination of the signal will be explained more fully hereinafter.

The signals supplied from the delay network 16 are coarsely quantized in quantizer 17 to four levels, for example. Quantizers capable of performing this function are well known in the art and will not be described in detail since this unit in itself forms no part of the invention. The output of the quantizer, which comprises a plurality of pulses of discrete amplitude levels, is then supplied to encoder 18 wherein an encoding process, to be described hereinafter, is accomplished. Encoder 18 may take any one of a number of forms depending on such things as the signal-to-noise ratio of the channel, and the particular type of transmission desired. It is to be noted, however, that in accordance with the illustrative embodiment of the invention, the output of the encoder 18 comprises a signal with an information rate of, for example, two bits per sample (which is also two bits per one-eighth microsecond), and which may include mode identification information.

Considering now the input video signal supplied to the two-megacycle sampler 19 by way of leads 12 and 14, the signal is repetitively sampled at the slow rate and held in circuit 20 for a period approximately equal to T. Although the two-megacycle samples need not be held, such an operation makes it easier for the encoder to operate. The circuit 20 may be a portion of the sampler 19 which in turn may be typically a "sample and hold" or "boxcar" circuit. The holding operation changes a train of impulses into a train of "boxcars" by holding each sample value until just before the next one comes along. The sampled staircase signal output of hold circuit 20 is supplied to delay network 21 which is similar to the delay network 16. Here the signal is delayed for a period T. The signal is then quantized to 128 levels, for example, in quantizer 22 and encoded in encoding device 23. The output of encoder 23, supplied to switch 24, comprises a signal with an information rate of two bits per one-eighth microsecond, that is, two bits per sample.

The output signal also includes the information necessary to identify it as a slow-mode pulse group.

Hence, in the illustrative embodiment there are supplied to switch 24 two encoded signals both requiring the same channel capacity, two bits per one-eighth microsecond, and, depending upon the switch position, one or the other of the encoded signals is supplied to transmitter 25 for transmission.

In order to determine which mode of transmission best enables the video signal to be represented in a "reduced" form with a minimum amount of degradation, the incoming signal must be examined continuously. This may be accomplished, for example, in adjacnet sample comparator 28 wherein adjacent conventional-rate samples of the television signal (i.e., eight-megacycle samples for a four-megacycle signal) are compared for changes in amplitude. A difference between two adjacent samples which exceeds a small fraction, say one-eighth of the peak-to-peak signal range, is indicative of a departure from a period of soft picture material and a shift to a period of fine detail material and will cause an output signal to be produced. This signal is coupled to bistable multivibrator 29 and causes it to shift from its first stable state to its second stable state where it will remain until subsequently returned to its first stable state by an appropriate reset signal. The voltage output of multivibrator 29 is utilized to operate electronic switch 24. Switch 24, which is normally in a position to select for transmision encoded signals from encoder 23, i.e., slow-mode representations of the video signal, may be, for example, an electronic gated switching device of any type well known in the art. A typical switch will be described, for purposes of illustration, hereinafter with reference to Fig. 4.

In the presence of both a signal from multivibrator 29, indicative of a change in amplitude in two adjacent samples of a predetermined amount, and a keying pulse, the switch will operate and select for transmission the encoded signals from encoder 18, i.e., the fast-mode representation of the input video signal.

It is thus in accordance with the invention to compare adjacent eight-megacycle samples for amplitude changes and to transmit the message wave in the fast mode, that is, quantizing at an eight-megacycle rate when adjacent samples differ by a predetermined amplitude value. Similarly it is in accordance with the invention to transmit the message wave finely quantized at a two-megacycle rate when changes in adjacent sample amplitudes are small. It can be seen that the decision as to which mode is appropriate must be made on one-half microsecond samples prior to the time that that portion of the signal is to be transmitted. This is accomplished by virtue of the delay elements 16 and 21 located respectively in the fast and slow-mode channels. The switching operation therefore is made to take place between the fourth sample of the signal sampled at the eight-megacycle rate, and the first sample of the subsequent four-sample interval.

Figure 2:
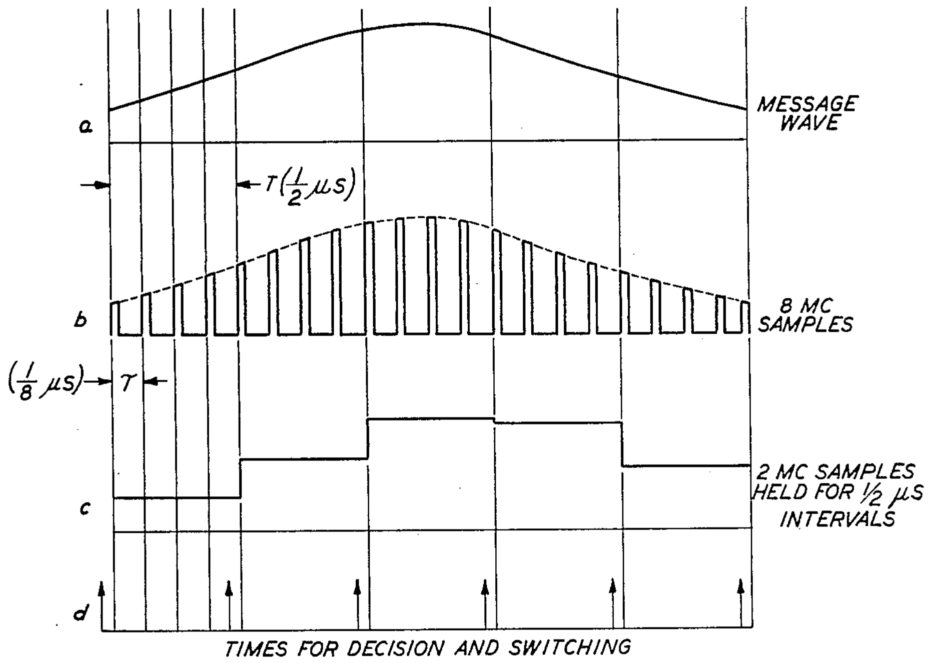

In Fig. 2(*a*), there is shown a portion of a typical message wave of the type which may be supplied to the transmission system of Fig. 1. Figs. 2(*b*) and (*c*) are, respectively, curves representing the message wave of curve 2(*a*) after sampling at an eight-megacycle rate, and after sampling and holding at the two-megacycle rate.

Fig. 2(*d*) indicates, by way of example, a suitable time for the decision and switching operation. Since it is obvious that a change in amplitude occurring between any two adjacent samples in any four-sample period will trip multivibrator 29 and cause an activating voltage signal to be applied to switch 24, a keying pulse which may occur at the times indicated in Fig. 2(*d*) may be utilized to prevent this premature switching and to restrict the switching to the appropriate times.

Such a two-megacycle keying pulse may be derived from a pulser circuit 37 which is driven at a two-megacycle rate by master oscillator 32. The pulser may be of any standard type well known to those skilled in the art and comprises typically a keyed pulse-forming network. Master oscillator 32 operates at a two-megacycle repetition rate and feeds both the two-megacycle pulser 37 and the eight-megacycle frequency multiplier 33. Frequency multiplier 33 in turn feeds an eight-megacycle pulser circuit 34 which is similar to pulser 37. In addition to providing the keying signals to switch 24, pulser 37 supplies two-megacycle pulses through delay network 38 to sampler 19. Similarly, eight-megacycle pulses from pulser 34 are fed to sampler 15 by way of delay network 35. Each of these networks provides a delay to insure that the switching operation is completed prior to the occurrence of the first sample in the next sampling interval. Thus, the sampling operation is carried out a short time after the key pulse output of pulser 37 is supplied to electronic switch 24. While these delays are not critical, they must be approximately equal to, but not greater than $\tau$, or one-eighth microsecond. Delay network 35 may be made adjustable so that pulse signals supplied to sampler 15 and sampler 19 are locked together in phase, that is to say, delay network 35 may be adjusted to compensate for phase delays occurring in the eight-megacycle oscillator 33 and pulser 34.

A two-megacycle pulse from pulser 37 may also be supplied by way of the delay device 31 to reset multivibrator 29 to its first stable state at the end of every four sampling periods so that it will be ready for another possible pulse from comparator 28 during the next half-microsecond interval. The delay device 31 delays the pulse for a period of time which is a small fraction of the period $\tau$ to insure that the switching operation is completed before multivibrator 29 is reset, and may also invert the pulse if that is necessary to the resetting operation. This of course depends on the multivibrator circuit itself and the manner of resetting, both operations being well known by those skilled in the art.

As stated above, it is within the practice of the invention to employ means for detecting amplitude differences between adjacvent samples. While it is not necessary that the examination be restricted to adjacent samples, comparator 28 may comprise, by way of example, the simple circuit shown in Fig. 3. Signal samples are passed to a subtractor circuit 46, which may be a differential amplifier or any other form of subtractor well known in the art, both directly and by way of delay element 47. Element 47 has a delay equal to $\tau$, which is one-eighth microsecond for an eight-megacycle sampling rate, so that effectively two adjacent signal sample values are supplied to the subtractor at the same time. Thus, if the difference in amplitude between two adjacent samples exceeds one-eighth of the peak-to-peak amplitude of the input signal level, an output signal is produced which, in turn, causes multivibrator 29 to change state. It is to be understood that a value of one eighth of the peak-to-peak signal amplitude is merely illustrative and any desired value may be used depending on the fineness of reproduction desired. Alternatively, an adjustable threshold sensitivity may be incorporated in the comparator in order to permit the ratio of fine mode representation to coarse mode representation of the input signal to be altered.

Figure 4:
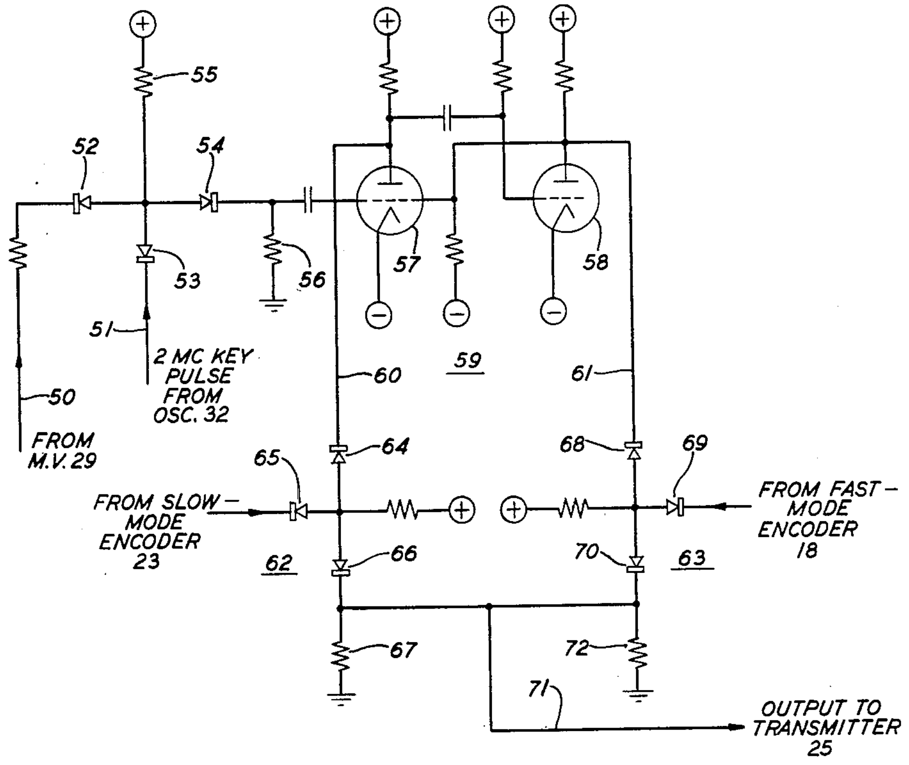
Fig. 4 is a schematic drawing of an electronic switch which may be used in the practice of the invention.

For purposes of illustration, there is shown in Fig. 4 an exemplary arrangement of an electronic switch 24 which can be used in the practice of the invention. As stated above, switch 24 is arranged to allow the output of encoder 23 to be fed to transmitter 25 in the absence of a signal from multivibrator 29 and a keying pulse. The last-mentioned signals are supplied to the switch of Fig. 4 on leads 50 and 51, respectively, and are utilized to operate a gating circuit comprised of asymmetrically-conducting devices 52, 53, and 54 having their like terminals connected together to form a T network. Coincidence or "AND" gating circuits of this type are well known in the art. Such a circuit displays high attenuation to an input signal when a control voltage of one polarity is applied in series with the shunt device, in this case device 53, and low attenuation when the control voltage is of the opposite polarity. The source of constant bias supplied by way of resistor 55 from a source of fixed potential is employed to substantially increase the signal amplitude which may be handled so that the pulse amplitudes supplied by multivibrator 29 and the two-megacycle pulse source are not critical. It is thus apparent that, in the presence of both a positive voltage from multivibrator 29 and a positive pulse from the two-megacycle pulse source, the gate circuit will allow a positive voltage to be developed across resistor 56 in the grid circuit of electron discharge device 57. It is to be understood that the two aforementioned pulses applied to the gate circuit may be of negative polarity. In such a case the bias polarity and the polarity of each of the asymmetrically-conducting devices must be reversed.

Electron discharge devices 57 and 58 are arranged in a typical monostable multivibrator circuit 59 with a time constant equal to T, which in the preferred embodiment is equal to one-half microsecond. Device 57 is normally nonconducting and device 58 is normally conducting. However, when a voltage is developed across resistor 56, the normally negative bias applied to the grid of device 57 is overcome, device 57 conducts and, in typical multivibrator fashion, cuts off device 58. This condition persists for one-half microsecond, at which time the circuit returns to its initial condition.

The voltages appearing on leads 60 and 61 are used to activate the biased gate circuits 62 and 63, respectively. Gate circuits 62 and 63 may be of the type disclosed in United States Patent 2,576,026 to L. A. Meacham, dated November 20, 1951. In the Meacham type gate the attenuation of the circuit is controlled by the application of a keying pulse. The output of encoder 18 is connected through the series connected devices 69 and 70 of the gate circuit 63 to the output lead 71, while the output of encoder 23 is connected to the output 71 by way of the series arms 65 and 66 of gate circuit 62. The asymmetrically-conducting devices 66 and 70, together with shunt impedances 67 and 72, afford adequate isolation between the two channels and yet permit a signal from one of the encoders to be supplied to the transmitter 25 in the presence of a keying pulse.

Consider now the operation of the switch in the absence of a signal from the multivibrator 29. Asymmetrically-conducting devices 52 and 54 exhibit high attenuation so that any signal developed across resistor 56 is not sufficient to cause discharge device 57 to conduct. As a result, discharge device 58 is fully conducting. In this condition the potential on lead 60 is nearly that of the 150 volt supply source of device 57 while the potential on lead 61 is considerably lower by virtue of the voltage drop produced by the impedance of the anode-cathode circuit of discharge device 58. Thus, a relatively positive voltage is applied by way of lead 60 to the gate circuit 62 by way of asymmetrically-conducting device 64 which holds open the gate and allows the output of the slow-mode encoder to produce an output voltage across resistor 67. Similarly, gate circuit 63 is closed by virtue of the lower relative voltage appearing on lead 61.

In the presence of a signal output from multivibrator 29 and a two-megacycle keying pulse, discharge device 57 is caused to conduct and a change of state occurs. Until the multivibrator returns to its steady state condition, the potentials on leads 60 and 61 are reversed, i.e., a high voltage on 61 and a lower voltage on 60. During this period, the output of the fast-mode channel from encoder 18 is supplied as an output signal across resistor 72. It is to be understood that the fixed bias on the gate circuits 62 and 63 may be appropriately adjusted so that the potentials on the leads 60 and 61 produce the operation as described above.

As was pointed out in the foregoing, the type of code used may be any one of a number of suitable codes well known to workers in the art. The way in which the present invention accomplishes a reduction in channel capacity can best be explained in relation to the particular type of coding used. If transmission over regular television channels is contemplated, then encoders 18 and 23 may comprise a remapping or recoding arrangement, such as that described in "Reducing Transmission Bandwidth," by R. S. Bailey and H. E. Singleton, Electronics, August 1948, wherein, for example, pairs of pulses, each pulse having $n$ possible amplitude levels, are combined into a single pulse having $n^2$ possible levels. The single pulse completely defines both of the pulses in the original pair. By employing this technique, the bandwidth is halved. It is to be understood that while the pulses referred to are conveniently pictured as square pulses, they may actually take the form of a smoothly varying time function which is sampled (for detection), at prescribed instants, as is well known to those skilled in the art.

Figure 5:
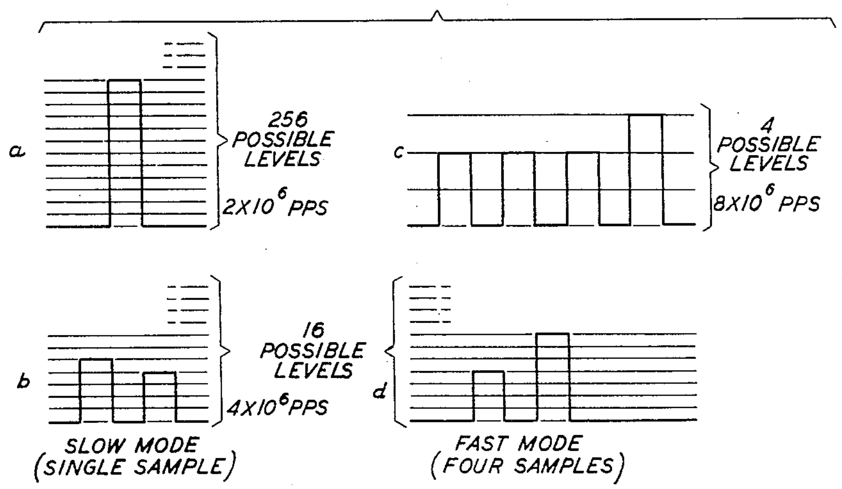
Fig. 5 illustrates particular encoding techniques suitable for use in the practice of the invention.

Fig. 5 illustrates this recoding technique as applied to both the slow-mode encoded signal and to the fast-mode encoded signal. As shown in Fig. 5(*a*), a single sample of coarse or slow-mode information is represented by a single pulse having any one of 256 possible discrete amplitude levels. In Fig. 5(*b*) the sample is shown encoded into two pulses each having 16 possible levels. Each pulse pair is thus capable of conveying 8 bits of information; this corresponds to an information rate of 2 bits per one-eighth microsecond. Since the pulses recur at the rate of four per microsecond, the minimum bandwidth required to preserve their amplitudes is two megacycles. Conversely, in Fig. 5(*c*), four samples of fast-mode information are shown, each quantized to one of 4 possible levels. By the recoding process, consecutive pairs of the fast 4-level samples can be encoded into a single pulse having 16 possible levels. Thus, as illustrated in Fig. 5(*d*), four fast-mode samples can be encoded into two pulses each having 16 possible levels. As in the case of the slow-mode samples, each pulse pair is capable of conveying 8 bits of information, corresponding to an information rate of 2 bits per one-eighth microsecond. Like the slow-mode pulses, the fast-mode pulses recur at a four-megacycle rate and therefore require the same two-megacycle bandwidth.

The "base" 16 was chosen for the present illustration because it is close to the largest number of levels which can possibly be handled by our best available conventional (continuous noisy) channels. Also, together with the other numbers chosen, it leads to a two-to-one saving in bandwidth. A two-megacycle channel with a signal-to-noise ratio of forty decibels (peak-to-peak signal/R.M.S. Gaussian noise) will transmit the 16-level pulses (four million p.p.s.) with an error probability of slightly less than one-tenth of one percent. Heretofore, the full potentialities of recoding after quantization as a means of reducing required bandwidth could not be realized because of the noise effects inherent in quantization, and because of channel noise. For example, a channel having forty decibels signal-to-noise ratio will transmit 100-level pulses with an error rate as large as sixty percent, making transmission of such signals impractical.

The realization by applicant of the fact that observer tolerance to quantization is much greater in the fine detailed portions of the picture makes possible, in the present invention, the use of two-to-one remapping, hence permitting substantial reductions in required channel capacity. Inasmuch as the fine detail portions of the video signal may be quantized quite coarsely with little or no apparent loss in fidelity of reproduction, the number of necessary levels in the coded pulse is substantially reduced, hence the deleterious effects of noise are likewise reduced.

A binary code ("base" equal to two) may also be a useful choice, since it offers great reliability under high noise level conditions. Systems using binary transmission, usually referred to as pulse code modulation (PCM) systems, utilize code groups of $n$ bivalued (on-off) pulses which define each signal sample to one of $2^n$ amplitude levels. In accordance with the present invention, the reduced number of quantizing levels in fast-mode operation leads directly to a reduced number of pulses per sample. Similarly, the reduced sampling rate in slow-mode operation leads to a reduced number of code groups per second. Thus, as indicated in Fig. 7 (discussed more fully below), a slow-mode sample is represented by eight pulses, occupying one-half microsecond, and a similar pulse group serves to represent four fast-mode samples. The resulting pulse rate is sixteen per microsecond for both modes. While this requires a transmission band of at least eight megacycles, conventional 64-level PCM requires at least twenty-four megacycles, and conventional 128-level PCM requires at least twenty-eight megacycles. Thus, dual-mode binary encoding yields a three to three and one-half fold saving over conventional binary PCM encoding.

While the reduction in the required channel capacity has been demonstrated for two types of encoding, reduction can also be achieved with various other types of encoding, such as, for example, variable length codes, or run length codes, both of which are shown and described in "Efficient Coding," by B. M. Oliver, Bell System Technical Journal, volume III, No. 4, July 1952. In addition, the use of other types of coding with the present invention permits, in some cases, taking advantage of the statistical distribution of the signal, with a consequent further reduction in required channel capacity.

As stated above, it is within the practice of the invention to transmit appropriate mode information to tell the decoder at the receiving station which form of encoding (slow-mode or fast-mode) was used. This may be accomplished in a number of ways.

Subjective tests indicate that of the 256 possible amplitude levels available for representing each slow-mode sample within the desirable information rate in use, 128 levels would be sufficient. The sample when quantized to 256 levels utilizes 8 bits of information while only 7 bits are necessary when quantized to 128 levels. The one bit per half-microsecond thus freed is available for mode information. One way of using this extra bit each half-microsecond is as follows.

Normally, during slow-mode operation, the "extra bit" conveys a "zero" but just before a switch to a fast-mode sample it conveys a "one." The other 7 bits, instead of giving the value of the last slow sample, give the number of fast samples approaching. During this final slow period, the previous sample may be held. The timing must be arranged appropriately by delaying the signal so that the switch to the fast mode takes place before the fine detail starts. A longer delay is required in order to have the advanced knowledge of the length of a fast-mode run.

Another way of sending mode information in accordance with the invention uses one bit per half-microsecond during both slow and fast-mode operation. This means that each half-microsecond block is individually labeled as to whether it constitutes one slow-mode sample or four fast-mode samples. Thus, use of only a particular set of 128 out of the available set of 256 code characters identifies the block as a slow-mode sample. Similarly, use of the remaining set of 128 code characters identifies the half-microsecond block as four fast-mode samples. Consequently, one bit of information-carrying capacity in each half-microsecond block is given to mode identification, leaving only 7 bits for signal representation. For the slow mode, this means 128 levels per sample and for the fast mode it means 4 levels for three out of four samples, and only 2 levels for the remaining sample. The latter restriction is not believed to be of serious consequence.

In line *b* of Fig. 6, individual half-microsecond blocks of the typical signal illustrated in line *a* are identified in the manner described above. The slow-mode block is identified by utilizing only 128 levels and the fast-mode block is identified by restricting every fourth pulse to 2 out of a possible 4 levels.

When the recoding system described above is utilized such that each slow-mode sample is recoded to two pulses of 16 possible levels each, and the fast-mode information is recoded so that four fast-mode samples become two pulses of 16 levels each, the identification system in accordance with the invention may take the form illustrated in line *c* of Fig. 6. The second of each pair of pulses is restricted to one half of the possible number of levels available. That is to say, the second of each pair of pulses is restricted to 8 possible levels instead of to 16 levels. For the slow-mode sample, for example, the second pulse is restricted to the lower 8 levels while for a fast sample the second pulse of each pair is restricted to the upper 8 levels. Alternatively, the first of each pair of pulses may be restricted to a predetermined number of levels as a means of identification. With this general method, only one-half microsecond advance exploration of the signal is needed since each half-microsecond block is individually labeled.

In the case of PCM, both a slow sample plus mode label and four fast samples plus mode label would be represented by eight binary pulses as illustrated in Figs. 7(*a*) and (*b*), respectively. Thus, as mentioned above for slow-mode information, eight binary pulses per half-microsecond interval are utilized. The first binary pulse may be utilized for conveying mode information. For example, a "one" may be used to identify the group of pulses as conveying slow-mode information. The seven remaining pulses convey the signal with 128-level accuracy. Similarly, eight binary pulses are utilized to convey four samples of fast-mode information. The first pulse then conveys a "zero" indicating fast-mode operation. Three of the following fast samples may be conveyed with two bits each while the fourth sample is restricted to one bit. As mentioned above, the degradation is not expected to be serious.

While the invention has been described primarily in connection with the block diagram of Fig. 1, it is evident that various other arrangements are possible which are within the scope of the invention. For example, the electronic switch 24 which, in Fig. 1, selectively chooses the encoded output signal from either encoder 18 or 23 in accordance with signal content, may equally well be located at a number of other locations in the circuit. By this expedient, the two encoder outputs, appearing on leads 41 and 42, may be directly coupled together and to the transmitter 25 in a number of ways well known to those skilled in the art, in a manner to both combine the signals and terminate the units. Thus, a simple switching arrangement, mechanical or electronic, producing an open circuit condition at any one of a number of points in one of the channels and a closed circuit condition at any one of a number of points in the other channel would satisfactorily achieve desirable channel economy through the use of two alternative modes of transmission.

Similarly, the adjacent sample comparator 28 can be arranged to examine the input signal by use of a separate sampler connected directly to the input lead 12. It is thus apparent that the switch 24 can also be located in the input leads 13 and 14, and in accordance with the signal content, determined as before, the input signal can be routed to one or the other channel. In such an embodiment, each channel operates on the signal only during the time when that mode is required.

Although the invention has been described with reference to particular illustrative embodiments, other embodiments and modifications within the spirit and scope of the invention will readily occur to one skilled in the art.

What is claimed is:

1. A system for the transmission of message signals comprising means for sampling said message signals at a first sampling rate, first encoding means for encoding the message samples produced at said first rate, means for sampling said message signal at a second sampling rate, second encoding means for encoding the message samples produced at said second rate, means for deriving a control signal indicative of the detail content of said message signal, and means responsive to said control signal for selectively transmitting the output of only one of said encoding means in accordance with the detail content of said message wave.

2. A system for the transmission of communication signals comprising a transmitter and a receiver, means at the transmitter for sampling the original signal to be transmitted at a first sampling rate, means for encoding successive samples of the signal produced at said first rate to produce a plurality of pulses indicative of said signal, means for sampling the original signal to be transmitted at a second sampling rate, means for encoding successive samples of the signal produced at said second rate to produce a plurality of pulses indicative of said signal, means for selectively transmitting to said receiver the output of only one of said encoding means in accordance with the detail content of said communication signal, and means at the receiver for decoding said pulses to produce the complete communication signal.

3. A system for the transmission of message signals according to claim 2 in which said means for encoding successive samples of the signal produced at said first rate includes means for encoding at least one pulse of said plurality of pulses produced at said first rate to be indicative of said first sampling rate, and in which said means for encoding successive samples of the signals produced at said second rate includes means for encoding at least one pulse of said plurality of pulses produced at said second rate to be indicative of said second sampling rate.

4. In a system for the transmission of message signals, means at the transmitter for reducing the required channel capacity comprising means for deriving a first set of samples from said message signal at one sampling rate, means for delaying said first set of samples, means for quantizing said first set of samples at a predetermined number of quantizing levels to produce a first set of quantized samples, means for encoding said first set of quantized samples, means for deriving a second set of samples from said message wave at a sampling rate different from said one sampling rate, means for delaying said second set of samples, means for quantizing said second set of samples at a number of quantizing levels different from the number of quantizing levels of said predetermined number, means for encoding said second set of quantized samples, means responsive to the detail content of said message signal for transmitting said first set of encoded samples to a receiving terminal when said message signal is composed predominantly of coarse detail material, and for transmitting said second set of encoded samples to said receiving terminal when said message signal is composed predominantly of fine detail material.

5. A system for the transmission of message signals according to claim 4 in which said means for encoding said first set of quantized samples includes means for identifying said first set of encoded samples as representing said message signal sampled at said one sampling rate.

6. A television system comprising first means supplied with television signal information for deriving a first set of message samples at a first predetermined rate, means for quantizing said first set of message samples to derive thereby a first set of quantized samples, delay means supplied with said first set of quantized samples for deriving a first set of delayed quantized samples, first encoding means supplied with said first set of delayed quantized samples for producing a plurality of pulses indicative of said first set of delayed quantized samples, second means supplied with the same television signal information for deriving a second set of message samples at a second predetermined rate, said second predetermined rate being different from said first predetermined rate, means for quantizing said second set of message samples to derive thereby a second set of quantized samples, delay means supplied with said second set of quantized samples for deriving a second set of delayed quantized samples, second encoding means supplied with said second set of delayed quantized samples for producing a plurality of pulses indicative of said second set of delayed quantized samples, means for transmitting said plurality of pulses produced by said first encoding means when said television signal comprises coarse detail material, and means for transmitting said plurality of pulses produced by said second encoding means when said television signal comprises fine detail material.

7. A television system according to claim 6 in which both said first encoding means and said second encoding means comprise means for converting each applied set of delayed quantized samples to a binary code pulse group.

8. The combination which comprises means for deriving from a signal to be transmitted a first regular sequence of signal samples, means for encoding each sample of said first sequence into a first binary permutation code pulse group representing a first particular fixed number of discrete values, means for deriving from the signal to be transmitted a second regular sequence of signal samples, means for encoding each sample of said second sequence into a second binary permutation code pulse group representing a second particular fixed number of discrete values, means responsive to the detail content of the signal to be transmitted for selecting said first code pulse group only for transmission when said signal is predominantly comprised of fine detail material and for selecting said second code pulse group only for transmission when said signal is predominantly comprised of coarse detail material, and means for decoding said code pulse group to provide an output signal.

9. A system for the transmission of message signals comprising means for sampling said message signals at a first repetition rate, encoding means for translating successive values of said sampled signal into a first sequence of permutation code group pulses, means for sampling said message signals at a second repetition rate, encoding means for translating successive values of said sampled signals into a second sequence of permutation code group pulses, means for receiving one of said signals for deriving a control signal responsive to the detail content of said message signal and means responsive to said control signal for transmitting only said first sequence of code group pulses when said message wave is predominantly comprised of fine detail material, and only said second sequence of code group pulses when said message wave is predominantly comprised of coarse detail material.

10. A system for the transmission of message signals according to claim 9 in which said encoding means for translating successive values of said sampled signals into a first sequence of permutation code group pulses includes means for identifying said first sequence of permutation code group pulses as representing said message signal sampled at said first repetition rate, and said encoding means for translating successive values of said sampled signals into a second sequence of permutation code group pulses includes means for identifying said second sequence of permutation code group pulses as representing said message signal sampled at said second repetition rate.

11. Transmission apparatus which comprises in combination with a signal source and an output terminal, means defining a first signal path from the source to the output terminal, said means including signal sampling means, quantizing means and encoding means connected in tandem, means defining a second signal path from said source to said output terminal, said last-mentioned means including signal sampling means, quantizing means and encoding means, connected in tandem, and switching means responsive to the rate of change of signal amplitude of signals from said signal source for selectively connecting either one or the other of said signal paths in signal coupling relation between said signal source and said output terminal.

12. Transmission apparatus which comprises in combination with a signal source and an output terminal, means defining a first signal path from the source to the output terminal, said means including signal sampling means for sampling signals from said signal source at a first predetermined rate, quantizing means for quantizing said signal samples to a fixed number of discrete values, and means for encoding each quantized sample into a plurality of pulses indicative of said signal; means defining a second signal path from said source to said output terminal, said means defining a second signal path including signal sampling means for sampling signals from said signal source at a second predetermined rate, said second predetermined rate being different from said first predetermined rate, quantizing means for quantizing said signal samples to a fixed number of discrete values, and means for encoding each quantized sample into a plurality of pulses indicative of said signal; and gating means supplied with said encoded pulses from said first signal path and with said encoded pulses from said second signal path for selectively connecting either one or the other of said signal paths in signal coupling relation between said signal source and said output terminal in response to amplitude changes in signals from said signal source.

13. Transmission apparatus as claimed in claim 12 wherein said signal source comprises apparatus for supplying signals which occupy a band of frequencies from zero to four megacycles.

14. Transmission apparatus as claimed in claim 13 wherein said means for sampling signals from said signal source at said first predetermined rate operates at eight megacycles per second, and said means for sampling signals from said signal source at said second predetermined rate operates at two megacycles per second.

15. Transmission apparatus as claimed in claim 13 wherein said quantizing means in said first signal path includes means for quantizing said signal samples to four discrete levels, and said quantizing means in said second signal path includes means for quantizing said signal samples to one hundred and twenty-eight discrete levels.

16. Transmission apparatus as claimed in claim 13 wherein the means for encoding each quantized sample in both said first and said second signal paths produces pulses in binary code form.

17. In a transmission system including a plurality of signal paths between a source of message signals and an output terminal, each of said paths including signal sampling means and signal quantizing means, encoding means in each of said signal paths for encoding the quantized signal samples produced in each of said paths in a manner whereby said encoded signals contain information indicative of the signal path followed by said signal, and means for supplying to said output terminal, encoded signals from one of said paths.

18. Transmission apparatus which comprises, in combination with a signal source and an output terminal, a fine grain encoder and a coarse grain encoder, said fine grain encoder and said coarse grain encoder being connected in parallel between said source and said output terminal and being alternatively actuatable, means for determining the momentary character of the signals of said signal source, and means responsive to the results of said determinations for selectively actuating one of said encoders.

19. Transmission apparatus which comprises, in combination with a signal source and an output terminal, a fine grain encoder and a coarse grain encoder, said fine grain encoder and said coarse grain encoder being connected respectively in a first path extending from said source to said output terminal and a second path extending from said source to said output terminal, means for determining the momentary character of the signals of said signal source, and means responsive to the results of said determination for selectively establishing only one of said paths.

References Cited in the file of this patent

UNITED STATES PATENTS

| | | |
|---|---|---|
| 2,516,587 | Peterson | July 25, 1950 |
| 2,543,736 | Trevor | Feb. 27, 1951 |
| 2,629,010 | Graham | Feb. 17, 1953 |
| 2,676,202 | Filipowsky | Apr. 20, 1954 |
| 2,677,721 | Bedford | May 4, 1954 |
| 2,801,281 | Oliver | July 30, 1957 |
| 2,824,172 | Cherry | Feb. 18, 1958 |
| 2,850,574 | Kretzmer | Sept. 2, 1958 |